UNITED STATES PATENT OFFICE.

ALBERT L. CLAPP, OF MARBLEHEAD, MASSACHUSETTS.

COUNTER-BOARD AND PROCESS OF PRODUCING THE SAME.

1,345,317. Specification of Letters Patent. Patented June 29, 1920.

No Drawing. Application filed July 11, 1918. Serial No. 244,476.

*To all whom it may concern:*

Be it known that I, ALBERT L. CLAPP, a citizen of the United States, residing at Marblehead, in the county of Essex and State of Massachusetts, have invented new and useful Improvements in Counter-Board and Processes of Producing the Same, of which the following is a specification.

This invention has for its object to produce improved "counter board" so-called, *i. e.* sheet material used for the manufacture of counter stiffeners for footwear. Such material is commonly made of sulfate and "Manila" pulp, in which aluminum resinate is precipitated from rosin-size (sodium resinate) by alum, while the pulp is in the beater, but it is relatively flabby and limp. I have discovered that a hard and resilient board can be produced, from which greatly improved counter stiffeners may be made, by incorporating in the fibrous beater stock a cement-like material resulting from the action of calcium hydroxid on sodium silicate.

As an example of one way of practising my process and producing an embodiment of my invention, I proceed as follows: 1000 pounds of the usual stock employed for the purpose, namely sulfate pulp, waste "Manila" paper, chips and cuttings of counter board (with or without disintegrated leather fiber or ground leather as a filler,) are loaded into the beating engine with sufficient water to insure a proper circulation. 10 to 15 pounds of calcium hydroxid and about 30 pounds of sodium resinate are then introduced into the beater, and the beating is carried on until the mass is a thorough mixture. Then 10 to 15 pounds sodium silicate are introduced into and thoroughly mixed with the mass by the continued operation of the beater. Then 40 to 60 pounds of alum are added to and thoroughly mixed in the mass, the alum reacting with the sodium resinate to precipitate aluminum resinate and the calcium hydroxid reacting with the sodium silicate and forming insoluble calcium silicate, such products of the reactions being precipitated and fixed upon the fibers in thorough distribution throughout the mass.

The soluble by-products of the reactions wash out, being dissolved in the water in the beater, and also in the water of the wet machine.

The pulp is then formed into matted sheets of the desired thickness by any suitable machine, such as a "wet machine" so-called, and, after being dried, is ready for use.

Sheet material, produced as herein described, when dry, is hard and resilient, is capable of being molded when in temper, and holds the molded shape.

In effect, in accordance with my process, the formation of the insoluble binder, resulting from the reaction of lime with sodium silicate, may be carried on coincidently with or superimposed upon the usual rosin-size process in which aluminum resinate is precipitated in the mass of pulp. The order in which the various steps are taken is of no moment, so long as the precipitates are formed in and uniformly distributed throughout the mass of pulp, so that the resulting sheets are physically homogeneous. In lieu of the stated initial raw materials, any other form of fiber used in the manufacture of paper or fiber board may be employed, together, if desired, with any suitable filler such as ground leather, tanners' waste, or ground spent tan bark, or other suitable material.

What I claim is:

1. Counter board consisting of an intimate mixture of suitable fiber, calcium silicate and aluminum resinate, said silicate and resinate being precipitated and fixed upon said fibers.

2. A method of making counter board which comprises mixing calcium hydroxid with the pulp, mixing sodium silicate with such mixture, and precipitating calcium silicate throughout the mass.

3. A method of making counter board which comprises precipitating aluminum resinate and calcium silicate throughout a mass of paper stock and disintegrated leather, and then forming said stock into a sheet of desired thickness.

4. A method of making counter board which consists in mixing sodium resinate and calcium hydroxid with the wet pulp, and adding alum and sodium silicate to the mass, to precipitate aluminum resinate and calcium silicate on the fibers throughout the mass.

In testimony whereof I have affixed my signature.

ALBERT L. CLAPP.